(12) United States Patent
Dou et al.

(10) Patent No.: US 8,891,684 B2
(45) Date of Patent: *Nov. 18, 2014

(54) NONLINEAR ESTIMATING APPARATUS AND METHOD AND RECEIVER

(71) Applicant: Fujitsu Limited, Kawasaki (JP)

(72) Inventors: Liang Dou, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 266 days.

This patent is subject to a terminal disclaimer.

(21) Appl. No.: 13/627,552

(22) Filed: Sep. 26, 2012

(65) Prior Publication Data

US 2013/0188948 A1 Jul. 25, 2013

(30) Foreign Application Priority Data

Sep. 26, 2011 (CN) .......................... 2011 1 0287852

(51) Int. Cl.
*H03K 9/00* (2006.01)
*H04B 10/2543* (2013.01)
*H04B 10/079* (2013.01)

(52) U.S. Cl.
CPC ........ *H04B 10/2543* (2013.01); *H04B 10/0795* (2013.01)
USPC ....................................... 375/316

(58) Field of Classification Search
CPC .......... H03K 9/00; H04B 10/00; H04B 10/04; H04B 10/18; H04B 10/25; H04B 10/58; H04B 15/00; H04J 14/06; H04L 5/12; H04L 25/03; H04L 25/49; H04L 27/00
USPC ................. 370/201; 375/254, 260, 296, 316; 398/28, 38, 149, 152, 192, 193, 208; 702/86

See application file for complete search history.

(56) References Cited

U.S. PATENT DOCUMENTS

| | | | |
|---|---|---|---|
| 2005/0163250 A1* | 7/2005 | McCallister | 375/296 |
| 2007/0036238 A1* | 2/2007 | Matero et al. | 375/296 |
| 2009/0225899 A1* | 9/2009 | Dent | 375/296 |

* cited by examiner

*Primary Examiner* — Sam K Ahn
*Assistant Examiner* — Shawkat M Ali
(74) *Attorney, Agent, or Firm* — Staas & Halsey LLP

(57) ABSTRACT

The present invention provides a nonlinear estimating apparatus and method, and a receiver. The nonlinear estimating apparatus includes: an information sequence acquiring unit, configured to acquire a symbol information sequence of the pulse signal inputted by a transmitting side; a perturbation quantity generating unit, configured to calculate the weighted sum of the interaction items of the pulses on one or more moments relative to the current moment, so as to obtain an additive perturbation quantity and a multiplicative perturbation quantity produced on a transmission link with a certain length; and a signal estimating unit, configured to estimating the signal received at a receiving side according to the symbol information sequence, the additive perturbation quantity and the multiplicative perturbation quantity. With the embodiments of the present invention, the accuracy of estimation of nonlinear signals may be further improved.

7 Claims, 6 Drawing Sheets

NONLINEAR ESTIMATING APPARATUS AND METHOD AND RECEIVER

CROSS REFERENCE TO RELATED APPLICATIONS

This application is claims the benefit of Chinese Application No. 201110287852.X, filed Sep. 26, 2011, the disclosure of which is incorporated herein by reference.

TECHNICAL FIELD

The present invention relates to the field of optical communication, and in particular to a nonlinear estimating apparatus and method and a receiver.

BACKGROUND ART

The nonlinearity in an optical fiber is originated from the Kerr effect, that is, the phase of transmitted light will be changed along with the variation of the power. Such nonlinearity is coupled with other linear effects (such as dispersion, and polarization mode dispersion, etc.), such that distortion occurs on the waveform of an optical signal at the receiver side.

It is found in studies that nonlinear Schrödinger equation may well describe the coupling between such two kinds of effects in the optical fiber. For the convenience of analysis, in a wavelength division multiplexing (WDM) optical communication system, the function of the nonlinearity may be deemed as two parts by some mathematical deformation: one part is originated from interactions between a plurality of channels (different wavelengths), and the other part is originated from interactions of the present channel (with the same compensation). In long-haul transmission, if the transmitted signal is a polarization multiplexed signal, a vector nonlinear Schrödinger equation may be substituted by a Manakov equation, in consideration of a statistical result of random birefringence in the optical fiber.

As the rise of transmission rate of single channel, the effect of intra-channel nonlinear originated from the present channel on the performance of a system becomes a problem drawing more and more attention of the people. When the rate of the single channel reaches 40-60 Gbits/s or more, the pulses within the same channel will be greatly widened and overlapped each other due to the effect of dispersion, and with the effect of the nonlinearity, energy exchange will occur between the overlapped pulses. In such a case, even though the residual dispersion in the link was compensated for at the receiving side, the system would still be severely nonlinearly damaged. The effect of nonlinearity within the channel on the system includes: timing jitter, signal amplitude fluctuation, and generation of ghost pulse.

For a long-haul optical communication system, how to compensate for or mitigate the cost of nonlinearity within a channel is an important question for study. Studies have been done with respect to design of link, DSP processing of receiver and coding of transmitting signal. A method for mitigating nonlinearity by subtracting nonlinear perturbation at a receiver side has been proposed in the prior art, refer to Reference [1] for details. Such a method is based on double oversampling, wherein a perturbation item is equal to a weighted sum of products of a series of three items (symbol information data of three moments), and the weighted value is decided by the dispersion, gain/attenuation and nonlinear coefficient of the link. The advantage of the method exists in the reduction of complexity, and especially in a PSK system, a pre-compensated waveform may completely be realized by means of addition and subtraction.

Since a nonlinear Schrödinger equation has no analytical solution under normal conditions, numerical simulation is often needed to obtain waveform distortion introduced by nonlinearity. Split-step Fourier method is a numerical simulation method that is most often used, which may infinitely approach a real solution when the step size is sufficiently small. However, the disadvantage of such a method is that it is too complex, and the simulation of a link configuration often needs several hours. And at the same time, it cannot give some physically visual explanations.

In Reference [2], Mecozzi et al. use a one-order perturbation model to mathematically transform a nonlinear Schrödinger equation. As the waveform distortion introduced by nonlinearity may be deemed as a weighted sum of a plurality of product items, each of the items is a product of transmission pulse amplitudes of three moments, and the coefficient is determined by the dispersion distribution of the link. Similar to that in a conventional nonlinear Schrödinger equation for numerical solution, Mecozzi et al. make nonlinear modeling within a channel to be a pure addition effect, and distinguish the effect of the link from the effect of the transmitted signal.

In Reference [3], Ernesto Ciaramella et al. make nonlinear modeling to be a pure multiplication effect, using also the one-order perturbation theory. In comparison with the addition model of Mecozzi et al., this model may tolerate greater input power (nonlinear) for some link configuration, and when the nonlinearity is relatively small, the results obtained by the two are identical.

In Reference [4], another model for nonlinear noise is a model based on mix of addition and multiplication proposed by Bononi et al., which is obtained by directly modifying an addition model, wherein the multiplication phase is a constant for different symbols.

However, in the implementation of the present invention, the inventors found the disadvantages of the prior art exist in: the case where both of the additive perturbation quantity and the multiplicative perturbation quantity are related to the current symbols and previous and subsequent symbols is not taken into consideration, and the accuracy of the signal estimation cannot be further improved.

Following documentations are listed for better understanding of the present invention and the prior art, which are incorporated herein by reference, as they are stated herein.

[Reference 1]: L. Dou, Z. Tao, L. Li, W. Yan, T. Tanimura, T. Hoshida, and J. C. Rasmussen, "A low complexity pre-distortion method for intra-channel nonlinearity," in *Proc. OFC/NFOEC*2011 *Conf.*, Los Angeles, U.S.A., March. 2011, paper OThF5.

[Reference 2]: IEEE PTL Vol. 12, No. 4, 2000, Antonio Mecozzi et. al.

[Reference 3]: IEEE PTL Vol. 17, 2005, pp 91, Ernesto Ciaramella et. al.

[Reference 4]: IEEE JLT, 2002, pp 1102, Bononi et. al.

SUMMARY OF THE INVENTION

The embodiments of the present invention provide a nonlinear estimating apparatus and method, and a receiver, with an object to further improve the accuracy of estimation of nonlinear signals at a receiving side.

According to an aspect of the embodiments of the present invention, there is provided a nonlinear estimating apparatus, includes:

an information sequence acquiring unit, configured to acquire a symbol information sequence of the pulse signal inputted by a transmitting side;

a perturbation quantity generating unit, configured to calculate the weighted sum of the interaction items of the pulses on one or more moments relative to the current moment, so as to obtain an additive perturbation quantity and a multiplicative perturbation quantity produced on a transmission link with a certain length; wherein the additive perturbation quantity is a weighted sum of the interaction items of the pulses excluding the current polarization state at the current moment, and the multiplicative perturbation quantity is a weighted sum of the interaction items of the pulses including the current polarization state at the current moment; and a signal estimating unit, configured to estimate the signal received at a receiving side according to the symbol information sequence, the additive perturbation quantity and the multiplicative perturbation quantity.

According to another aspect of the embodiments of the present invention, there is provided a nonlinear estimating method, includes:

an information sequence acquiring step for acquiring a symbol information sequence of the pulse signal inputted by a transmitting side;

a perturbation quantity generating step for calculating the weighted sum of the interaction items of the pulses on one or more moments relative to the current moment, so as to obtain an additive perturbation quantity and a multiplicative perturbation quantity produced on a transmission link with a certain length; wherein the additive perturbation quantity is a weighted sum of the interaction items of the pulses excluding the current polarization state at the current moment, and the multiplicative perturbation quantity is a weighted sum of the interaction items of the pulses including the current polarization state at the current moment; and a signal estimating step for estimating the signal received at a receiving side according to the symbol information sequence, the additive perturbation quantity and the multiplicative perturbation quantity.

According to still another aspect of the embodiments of the present invention, there is provided a receiver, includes the nonlinear estimating apparatus as stated above.

The advantages of the embodiments of the present invention exist in: an additive perturbation quantity and a multiplicative perturbation quantity produced on a transmission link with a certain length are obtained by calculating the weighted sum of the interaction items of the pulses on one or more moments, and at a receiving side the nonlinear signal is estimated according to the time-varying additive perturbation quantity and multiplicative perturbation quantity; the accuracy of the estimation may be further improved, and the calculation method is simple, applicable to single polarization and polarization multiplexing systems, and at the same time, compatible with any modulation formats.

These and further aspects and features of the present invention will be apparent with reference to the following description and attached drawings. It is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 4 (B) is a constellation map obtained by the nonlinear estimation of the embodiments of the present invention;

FIG. 4 (C) is a constellation map obtained by the full additive model of the prior art;

FIG. 4 (D) is a constellation map obtained by the addition and constant rotation of the prior art;

DETAILED DESCRIPTION OF THE INVENTION

The preferred embodiments of the present invention are described as follows in reference to the drawings. These embodiments are illustrative only, and are not intended to limit the present invention. For the easy understanding of the principles and embodiments of the present invention by those skilled in the art, the embodiments of the present invention shall be described taking an optical communication system as an example. However, it should be noted that the embodiments of the present invention are applicable to all the communication systems in which there exists nonlinear loss.

Figure 1:
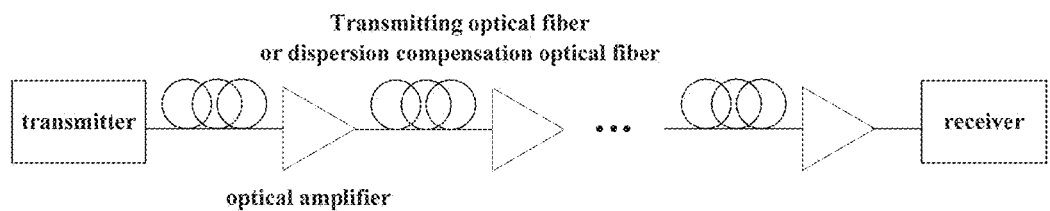
FIG. 1 is a schematic diagram of a typical optical communication system.

FIG. 1 is a schematic diagram of a typical optical communication system, in which the signal transmitted by a transmitter passes different devices (such as an optical fiber, an optical amplifier, and a dispersion compensation optical fiber, etc.) in a transmission link and reaches a receiver. In the embodiments of the present invention, the symbol information sequences of the inputted pulse signals are compensated for at the transmitting side by a nonlinear compensating apparatus, such that the transmitting side transmits specifically-deformed signals, and after these signals are subjected to the nonlinear effect of optical fiber transmission, ideal undamaged signals are obtained at the receiver.

In the system shown in FIG. 1, in order that received signals can be estimated at the receiving side, the inventors first modeled intra-channel nonlinearity in the implementation of the present invention, and then estimated the received signals via the original pulse signals at the transmitting side according to the nonlinear model.

In normal conditions, polarization multiplexing is often used at the transmitter side, so as to increase the spectrum efficiency to the greatest extent. Hence, a process of obtaining an intra-channel nonlinear model is described below taking dual polarization as an example.

First, for a vector signal, the transmission optical fiber may be modeled as a Manakov equation, as shown by formula (1) below:

$$\frac{\partial}{\partial z}u_H(t, z) + \frac{\alpha(z)}{2}u_H(t, z) + j\frac{\beta_2(z)}{2}\frac{\partial^2}{\partial t^2}u_H(t, z) = \qquad (1)$$
$$j\gamma(z)[|u_H(t, z)|^2 + |u_V(t, z)|^2]u_H(t, z)$$

$$\frac{\partial}{\partial z}u_V(t, z) + \frac{\alpha(z)}{2}u_V(t, z) + j\frac{\beta_2(z)}{2}\frac{\partial^2}{\partial t^2}u_V(t, z) =$$
$$j\gamma(z)[|u_V(t, z)|^2 + |u_H(t, z)|^2]u_V(t, z)$$

where, $u_H(t,z)$ and $u_V(t,z)$ are electrical field components of the signal at the horizontal H and vertical V polarization states, respectively, and $\alpha(z)$, $\beta_2(z)$ and $\gamma(z)$ denote respectively distributions of attenuation coefficient, dispersion coefficient and nonlinearity coefficient in the optical link along the transmission distance.

Second, as the signals generated by the transmitter usually consist of optical pulses, the electrical field components at the transmitter side may be in the form expressed by formula (2) below:

$$u_H(t, z = 0) = \sum_k A_k^H g(t - kT) \qquad (2)$$

$$u_V(t, z = 0) = \sum_k A_k^V g(t - kT)$$

where, $A_k^H$ and $A_k^V$ are information symbols of the k(th) pulse at the horizontal H and vertical V polarization states, respectively, T is the pulse interval, and g(t) is the waveform of each of the pulses. It should be pointed out here that even though the signals transmitted by the transmitter are of any waveforms, the transmitted signals may still be deemed as being in the form expressed by formula (2), only if the time interval T is set sufficiently small.

Last, formula (1) is substituted by formula (2), in a case where the input power is not extremely great (that is, the nonlinearity of the optical link is not very intense), formula (1) may be solved by using the perturbation theory, and formula (3) is obtained:

$$u_H(t = kT, z = L) = u_H(t = kT, 0) + \qquad (3)$$
$$\sum_{m,n}\{[A_{m+k}^H A_{n+k}^H (A_{m+n+k}^H)^* + A_{m+k}^H A_{n+k}^V (A_{m+n+k}^V)^*]C(m, n, z = L)\}$$

$$u_V(t = kT, z = L) = u_V(t = kT, 0) +$$
$$\sum_{m,n}\{[A_{m+k}^V A_{n+k}^V (A_{m+n+k}^V)^* + A_{m+k}^V A_{n+k}^H (A_{m+n+k}^H)^*]C(m, n, z = L)\}$$

Where, in formula (3), the electrical field value at the k(th) pulse sampling moment at the receiver side consists of the electrical field value and perturbation quantity of the k(th) pulse at the transmitting side, and wherein, the perturbation quantity is a weighted sum of a plurality of interaction items, each item being a product of transmitting pulse information symbols on one or more moments. Where, in the process of solving formula (1) by using the perturbation theory, low-order items are taken and high-order items are neglected in calculation.

Hence, a weighted sum of interactions of the pulses at three moments, the (m+k)th moment, the (n+k)th moment and the (m+n+k)th moment, relative to the k(th) pulse sampling moment, is only needed to be calculated for formula (3). However, if high-order items are taken into consideration in the solving process, a weighted sum of interactions of the pulses at more than three moments relative to the k(th) pulse sampling moment needs to be calculated.

The pulses at three moments used for the k(th) pulse are not arbitrary, and the temporal relationship between them satisfies formula (m+k)+(n+k)−(m+n+k)=k. Where, m, n and k may be equal, i.e. they may be one or more moments relative to the current moment. It should be noted that the present invention is not limited thereto, and these three pulses may have other forms of combination, with the coefficients corresponding to them needing to be modified accordingly.

Following description is given taking a weighted sum of interactions of three pulses as an example. It should be noted that the present invention is not limited thereto, and the case where there are more than three pulses is similar to the case where there are three pulses.

It can be seen from formula (3) that the perturbation item at the current polarization state is originated from two parts, and one part is originated from the present polarization state, and the other part is originated from an orthogonal polarization state. For example, for the horizontal polarization state, the part originated from the present polarization state is $A_{m+k}^H A_{n+k}^H (A_{m+n+k}^H)^*$, and the part originated from the orthogonal polarization state is $A_{m+k}^H A_{n+k}^V (A_{m+n+k}^V)^*$. The case of a vertical polarization state is similar to this, which shall not be described any further.

Since the symbol information of two polarization states always appears symmetrically in Manakov equation (1), such symmetry finally results in that the coefficients of the two parts of perturbation items of horizontal and vertical polarization states are identical. These coefficients are only related to the configuration of the link and the relative positions (m, n) of the interacted pulses and the pulse at the current moment.

On the basis of the above nonlinear model, specifically deformed signals are transmitted at the transmitting side, and after these signals are subjected to the nonlinear effect of optical fiber transmission, ideal undamaged signals are obtained at the receiving side. Where, it is assumed that the linear damage of the channel has been compensated for in other ways.

Furthermore, formula (4) below may be obtained in an equal-order way by sorting formula (3):

$$u_H(t = kT, z = L) = A_k^H + \qquad (4)$$
$$A_k^H \left[\sum_n (2|A_{n+k}^H|^2 + |A_{n+k}^V|^2)C(0, n, z = L) - |A_k^H|^2 C(0, 0, z = L)\right] +$$
$$\sum_{mn \neq 0} [A_{m+k}^H A_{n+k}^H (A_{m+n+k}^H)^* + A_{m+k}^H A_{n+k}^V (A_{m+n+k}^V)^*]C(m, n, z = L) +$$
$$\sum_{m \neq 0} A_{m+k}^H A_k^V (A_{m+k}^V)^* C(m, 0, z = L)$$

$$u_V(t = kT, z = L) = A_k^V +$$
$$A_k^V \left[\sum_n (2|A_{n+k}^V|^2 + |A_{n+k}^H|^2)C(0, n, z = L) - |A_k^V|^2 C(0, 0, z = L)\right] +$$
$$\sum_{mn \neq 0} [A_{m+k}^V A_{n+k}^V (A_{m+n+k}^V)^* + A_{m+k}^V A_{n+k}^H (A_{m+n+k}^H)^*]C(m, n, z = L) +$$
$$\sum_{m \neq 0} A_{m+k}^V A_k^H (A_{m+k}^H)^* C(m, 0, z = L)$$

As to formula (4), both the second items to the right of the equal marks contain current symbol information $A_k^H$ or $A_k^V$ and multiplicative operation is performed on the current symbol. When mn=0, the imaginary part of the coefficient C(m,n) is much greater than the real part, hence, it can be approximately considered as a pure imaginary number. In consideration of $\exp(j\theta)\approx 1+j\theta$, the second items in formula (4) may be deemed as an angular rotational operation; and both of the last two items do not contain the current symbol information, and are additive perturbations.

What described above is detailed explanation of dual polarization signals. For single polarization signals, following formula may be obtained accordingly:

$$u(t=kT, z=L) = \qquad (5)$$

$$A_k + A_k\left[\sum_n 2|A_{n+k}|^2 C(0,n,z=L) - |A_k|^2 C(0,0,z=L)\right] +$$

$$\sum_{mn\neq 0} A_{m+k} A_{n+k} (A_{m+n+k})^* C(m,n,z=L)$$

On the basis of the above analysis, the nonlinear estimating apparatus and method, and receiver of the embodiments of the present invention shall be described in detail taking the optical communication system shown in FIG. 1 and the nonlinear model based on the communication system as an example.

Figure 2:
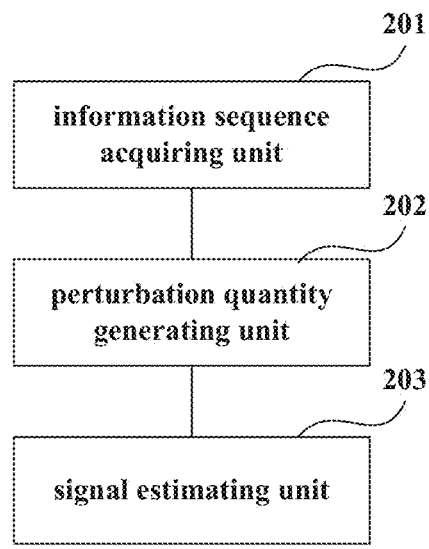
FIG. 2 is a schematic diagram of the nonlinear estimating apparatus of the embodiments of the present invention.

FIG. 2 is a schematic diagram of the nonlinear estimating apparatus of the embodiments of the present invention. As shown in FIG. 2, the nonlinear estimating apparatus includes: an information sequence acquiring unit 201, a perturbation quantity generating unit 202, and a signal estimating unit 203.

Where, the information sequence acquiring unit 201 is used for acquiring a symbol information sequence of the pulse signal inputted by a transmitting side; the perturbation quantity generating unit 202 is used for calculating the weighted sum of the interaction items of the pulses on one or more moments relative to the current moment, so as to obtain an additive perturbation quantity and a multiplicative perturbation quantity produced on a transmission link with a certain length, and the signal estimating unit 203 is used for estimating the signal received at a receiving side according to the symbol information sequence, the additive perturbation quantity and the multiplicative perturbation quantity.

Where, the additive perturbation quantity is a weighted sum of the interaction items of the pulses excluding the current polarization state at the current moment, and the multiplicative perturbation quantity is a weighted sum of the interaction items of the pulses including the current polarization state at the current moment. Thus, what is different from the prior art is that both the additive perturbation quantity and the multiplicative perturbation quantity in the present invention are time varying, and the accuracy of signal estimation may be further improved by hybrid operation of the time-varying additive perturbation quantity and multiplicative perturbation quantity.

In this embodiment, the symbol information sequence obtained by the information sequence acquiring unit 201 is symbol information before compensation; where the symbol information is related to the used modulation format, and the symbol information is different for different modulation formats. For example, for the OOK modulation format, the symbol information sequence is 0, 1; for the BPSK modulation format, the symbol information sequence is –1, 1; and for the QPSK modulation format, the symbol information sequence is 1, j, –1, –j.

In this embodiment, the signal estimating unit 203 is particularly used for estimating the signals received by a receiving side, by performing hybrid operation of the symbol information sequence obtained by the information sequence acquiring unit 201 and the additive perturbation quantity and multiplicative perturbation quantity obtained by the perturbation quantity generating unit 202.

In particular implementation, the signal estimating unit 203 may perform additive operation first, and then perform multiplicative operation, or may perform multiplicative operation first, and then perform additive operation, and so forth. For example, the signal estimating unit 203 may perform additive operation first on the symbol information sequence and the additive perturbation quantity, and then perform multiplicative operation on the result of operation and the multiplicative perturbation quantity. However, the present invention is not limited thereto, and detailed manners of implementation may be determined as actually required.

In particular implementation, a corresponding hardware circuit may be used, which may be implemented by an adder, a multiplier, or a logic operation circuit, etc. For example, for PSK signals, the multiplication between the symbols may be realized by a lookup table, and the multiplication between PSK signals and the Coef may be realized by logic operation and an adder. Existing elements may used in implementation, which shall not be described any further.

It can be seen from the above embodiment that an additive perturbation quantity and a multiplicative perturbation quantity produced on a transmission link with a certain length are obtained by calculating the weighted sum of the interaction items of the pulses at several different moments, and at a receiving side the nonlinear signal is estimated according to the time-varying additive perturbation quantity and the multiplicative perturbation quantity; the accuracy of the estimation may be further improved, and the calculation method is simple, applicable to single polarization and polarization multiplexing systems, and at the same time, compatible with any modulation formats.

Figure 3:
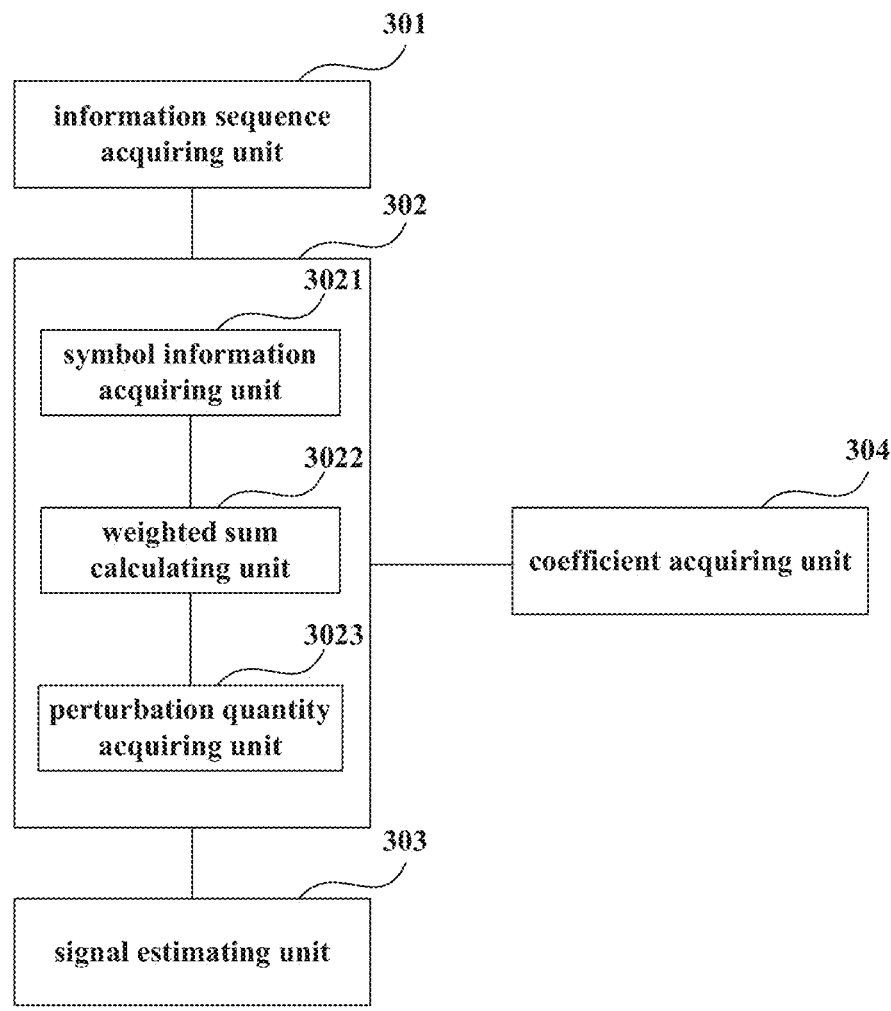
FIG. 3 is another schematic diagram of the nonlinear estimating apparatus of the embodiments of the present invention.

FIG. 3 is another schematic diagram of the nonlinear estimating apparatus of the embodiments of the present invention. As shown in FIG. 3, the nonlinear estimating apparatus includes: an information sequence acquiring unit 301, a perturbation quantity generating unit 302, and a signal estimating unit 303, with their functions being similar to those of the corresponding parts of the nonlinear estimating apparatus shown in FIG. 2, which shall not be described any further.

In this embodiment, the perturbation quantity generating unit 302 may use the following construction to calculate and process the perturbation quantity. As shown in FIG. 3, the perturbation quantity generating unit 302 may particularly include: a symbol information acquiring unit 3021, a weighted sum calculating unit 3022 and a perturbation quantity acquiring unit 3023.

Where, the symbol information acquiring unit 3021 is used for acquiring symbol information of the pulses for each of multiple interaction items on one or more moments relative to the current moment;

the weighted sum calculating unit 3022 is used for calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and the perturbation quantity acquiring unit 3023 is used for obtaining the additive perturbation quantity and the multiplicative perturbation quantity produced on a transmission link with a certain length according to the sum of the weighted values of the multiple interaction items of pulses.

Following description is given, taking calculation of a weighted sum of interactions of the pulses at the (m+k)th moment, the (n+k)th moment and the (m+n+k)th moment, relative to the k(th) pulse sampling moment, as an example. Where, the number of the items for calculating a weighted sum of interactions of pulses of several items on three moments relative to the current moment is determined by a predefined (m, n) value.

It should be noted that m, n and k satisfy formula (m+k)+(n+k)−(m+n+k)=k. Where, m, n may be any integers, i.e. the pulse sampling moments may be one or more moments relative to the current moment.

Furthermore, in an particular embodiment, mn≠0 denotes that either of m and n is not equal to 0. Thus, (m+k) and (n+k) may be equal, but not equal to (m+n+k), that is, the pulse sampling moments may be at least two moments relative to the current moment.

Therefore, the perturbation quantity generating unit 302 may be particularly used to calculate a weighted sum of interactions of pulses at three moments, such as the (m+k)th moment, the (n+k)th moment and the (m+n+k)th moment, relative to the current moment, such as the k(th) moment, so as to obtain perturbation of the nonlinear effect of the current k(th) moment in passing a transmission link with a certain length.

In an embodiment, for dual polarization signals, the perturbation quantity generating unit 302 may obtain additive perturbation quantity and multiplicative perturbation quantity produced on a transmission link with a certain length according to formula (4). For example, additive perturbation quantity may be obtained according to the third item and the fourth item of the current polarization state in formula (4) excluding the current moment, and multiplicative perturbation quantity may be obtained according to the second item of the current polarization state in formula (4) excluding the current moment. Details are shown in formulas (6) and (7) below.

$$\Delta_k^{add} = \qquad\qquad (6)$$
$$\sum_{mn\neq 0} [A_{m+k}^H A_{n+k}^H (A_{m+n+k}^H)^* + A_{m+k}^H A_{n+k}^V (A_{m+n+k}^V)^*] C(m, n, z = L) +$$
$$\sum_{m\neq 0} A_{m+k}^H A_k^V (A_{m+k}^V)^* C(m, 0, z = L)$$
$$\Delta_k^{mul} = -j\sum_n [(2|A_{n+k}^H|^2 + |A_{n+k}^V|^2) C(0, n, z = L) - |A_k^H|^2 C(0, 0, z = L)]$$

$$\Delta_k^{add'} = \qquad\qquad (7)$$
$$\sum_{mn\neq 0} [A_{m+k}^V A_{n+k}^V (A_{m+n+k}^V)^* + A_{m+k}^V A_{n+k}^H (A_{m+n+k}^H)^*] C(m, n, z = L) +$$
$$\sum_{m\neq 0} A_{m+k}^V A_k^H (A_{m+k}^H)^* C(m, 0, z = L)$$
$$\Delta_k^{mul'} = -j\sum_n [(2|A_{n+k}^V|^2 + |A_{n+k}^H|^2) C(0, n, z = L) - |A_k^V|^2 C(0, 0, z = L)]$$

where, $\Delta_k^{add}$ and $\Delta_k^{add'}$ denote the additive perturbation quantity, $\Delta_k^{mul}$ and $\Delta_k^{mul'}$ denote the multiplicative perturbation quantity, C(m, n, z=L) denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

Therefore, the signal estimating unit 203 may use the following formula to estimate the signals:

$$u_H(t=kT,z=L) = (A_k^H + \Delta_k^{add}) e^{j\Delta_k^{mul}}$$
$$u_V(t=kT,z=L) = (A_k^V + \Delta_k^{add'}) e^{j\Delta_k^{mul'}} \qquad (8)$$

In another embodiment, for single polarization signals, the perturbation quantity generating unit 302 may obtain additive perturbation quantity and multiplicative perturbation quantity produced on a transmission link with a certain length according to formula (5). For example, additive perturbation quantity may be obtained according to the third item of the current polarization state in formula (5) excluding the current moment, and multiplicative perturbation quantity may be obtained according to the second item of the current polarization state in formula (5) excluding the current moment. Details are shown in formula (9) below.

$$\Delta_k^{add} = \sum_{mn\neq 0} A_{m+k} A_{n+k} (A_{m+n+k})^* C(m, n, z = L) \qquad (9)$$
$$\Delta_k^{mul} = -j\left[\sum_n 2|A_{n+k}|^2 C(0, n, z = L) - |A_k|^2 C(0, 0, z = L)\right]$$

where, $\Delta_k^{add}$ denotes the additive perturbation quantity, $\Delta_k^{mul}$ denotes the multiplicative perturbation quantity, C(m, n, z=L) denotes the weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

Therefore, the signal estimating unit 203 may use the following formula to estimate the signals:

$$u(t=kT,z=L) = (A_k + \Delta_k^{add}) e^{j\Delta_k^{mul}} \qquad (10)$$

How the perturbation quantity generating unit 302 and the signal estimating unit 303 are realized is described above in detail. It should be noted that suitable variation or modification may be made by those skilled in the art according to the contents disclosed above. The formulas of the present invention are illustrative only, and the present invention is not limited thereto.

In this embodiment, C(m, n, z=L) is correspondingly a weighted coefficient of interactions of the m(th), n(th) and (m+n)th pulses relative to the current moment. It should be pointed out here that in a polarization multiplexing system, three pulses mutually interacted may be originated from the same polarization state, and may be originated from different polarization states. The weighted coefficient to which each of the items corresponds may be obtained in advance, for used by the weighted sum calculating unit 3022 in calculating weighted values.

As shown in FIG. 3, the nonlinear estimating apparatus may further include a coefficient acquiring unit 304. The coefficient acquiring unit 304 is used for acquiring the weighted coefficient to which each of the items corresponds by simulation, or acquiring the weighted coefficient to which each of the items corresponds by experiment, or acquiring the weighted coefficient to which each of the items corresponds according to the configuration of the transmission link and the positions of pulses interacted on one or more moments relative to the position of the pulses on the current moment.

Where, when the weighted coefficient is obtained on the basis of simulation and experiment, different transmission signals may be designed in the simulation or experiment, and the value of the weighted coefficient is derived inversely according to the received signals. And the accuracy of such a method is high.

Where, when the weighted coefficient of each of the items is obtained by the coefficient acquiring unit 304 according to the configuration of the transmission link and the positions of pulses interacted on one or more moments relative to the position of the pulses on the current moment, the coefficient acquiring unit 304 may use the following formula to calculate the weighted coefficient:

$$C(m, n, z = L) = j \int_0^L \frac{\gamma(z)p(z)}{\sqrt{1 + 2js(z)/\tau^2 + 3(s(z)/\tau^2)^2}} \exp \left\{ -\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]} \right\} dz \quad (11)$$

Where, if the current moment is the k(th) moment, the three moments relative to the current moment are the (m+k)th moment, the (n+k)th moment and the (m+n+k)th moment; and each of several (m, n) values corresponds to different weighted coefficients C(m, n, z=L). Where, the values of m and n may be any values in the range from minus infinity to plus infinity, and are related to all the values before and after the k(th) moment.

Furthermore, it is usually that as the absolute values of (m, n) values increase, the absolute values of C(m, n, z=L) values decrease. Hence, a certain number of (m, n) values may be taken for calculating perturbation quantity according to a required accuracy of calculation. Thus, the values of m and n may be taken in the following manner: in taking m and n, when the modulus |C(m, n, z=L)| of the weighted coefficient C(m, n, z=L) obtained according to m and n is greater than or equal to a predefined value, m and n are taken; otherwise, m and n are not taken. The predefined value may be set according to a certain proportional coefficient of the maximum modulus of all the coefficients. For example, normalized coefficients C may be taken from all the combinations of m and n satisfying |C(m, n, z=L)|>1e−3*max(|C(m, n, z=L)|).

Where, p(z) denotes the power of the signal on the transmission link spaced apart from the transmitting side by z, s(z) denotes the accumulated net dispersion value on the transmission link spaced apart from the transmitting side by z, t denotes a half value width of the pulse, T denotes a pulse interval, and γ(z) denotes the nonlinear coefficient on the transmission link spaced apart from the transmitting side by z;

or, when the transmission link does not contain a dispersion compensating module, the attenuation in the transmission of the signals is neglected, and the dispersion coefficient and the nonlinear coefficient do not vary along with the distance of transmission, the coefficient acquiring unit 304 may further use the following formula to calculate the weighted coefficient:

$$C(m, n, z = L) = j \frac{\gamma p_0 \tau^2}{\sqrt{3} |\beta_2|} \exp \text{int}\left(-j \frac{mnT^2}{\beta_2 L}\right) \quad (12)$$

where, γ denotes the nonlinear coefficient, $p_0$ denotes the power of the signal at the transmitting side, $\beta_2$ denotes the dispersion coefficient, and exp int denotes an exponential integral function, the integral function being capable of expressed as $$\exp \text{int}(z) = \int_z^\infty \frac{e^{-x}}{x} dx.$$

The nonlinear estimating apparatus may further include a storing unit for storing the obtained weighted coefficients for use in calculating the weighted values; furthermore, the storing unit may also store channel coefficients for calculating the weighted coefficients, such as the nonlinear coefficient γ, the dispersion coefficient $\beta_2$, and the length L of the transmission link, etc.

The nonlinear estimating apparatus of the present invention is described in detail above. The technical effect of the present invention shall be described below by way of a particular example. As to the single polarization system, exemplary coefficients include: a baud rate of 32 G, a modulation format of 16QAM, transmission power of 6.4 dBm, transmission is performed via 60 km of single-mode optical fiber, and the dispersion in the link is compensated for at the receiver.

Figure 4:
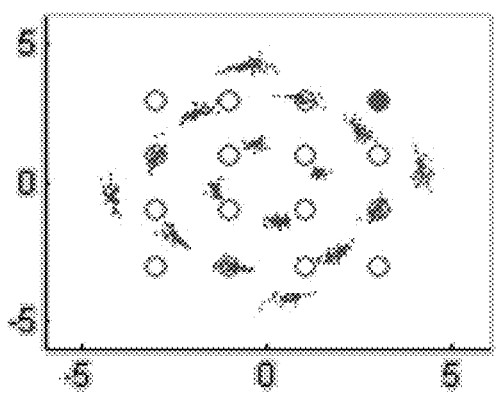
FIG. 4 (A) is a constellation map obtained by direct simulation after intra-channel nonlinear interference.
Figure 4:
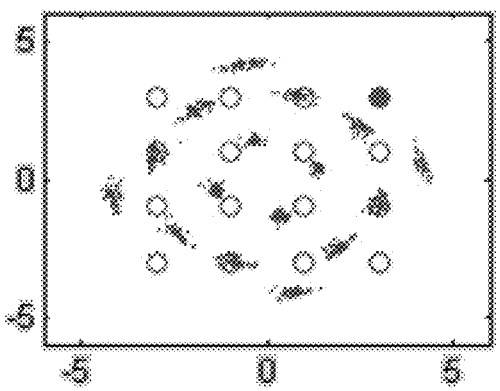
Figure 4:
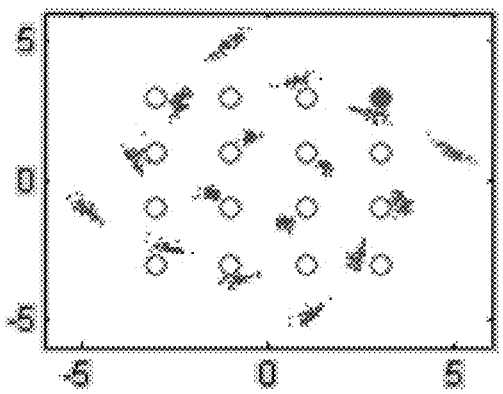
Figure 4:
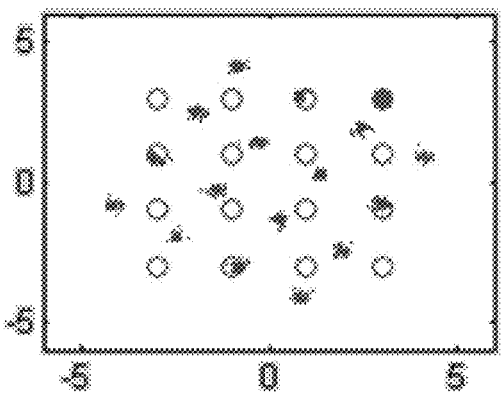

FIG. 4 (A) to FIG. 4 (D) show comparison of constellation maps obtained at the receiving side in the above embodiments. Where, FIG. 4 (A) is a constellation map obtained by direct simulation after intra-channel nonlinear interference, FIG. 4 (B) is a constellation map obtained by the nonlinear estimation of the embodiments of the present invention, FIG. 4 (C) is a constellation map obtained by the full additive model of the prior art, and FIG. 4 (D) is a constellation map obtained by the addition and constant rotation of the prior art.

It can be easily seen from FIG. 4 (A) to FIG. 4 (D) that the embodiments of the present invention use a hybrid model of addition and multiplication with time-varying additive perturbation quantity and multiplicative perturbation quantity, and the result of estimation is more close to the actual result of simulation, thereby improving the accuracy of signal estimation.

It can be seen from the above embodiment that an additive perturbation quantity and a multiplicative perturbation quantity produced on a transmission link with a certain length are obtained by calculating the weighted sum of the interaction items of the pulses at one or more moments, and at a receiving side the nonlinear signal is estimated according to the time-varying additive perturbation quantity and the multiplicative perturbation quantity; the accuracy of the estimation may be further improved, and the calculation method is simple, applicable to single polarization and polarization multiplexing systems, and at the same time, compatible with any modulation formats.

The embodiments of the present invention further provide a nonlinear estimating method. And the parts identical to those in the above embodiments shall not described any further.

Figure 5:
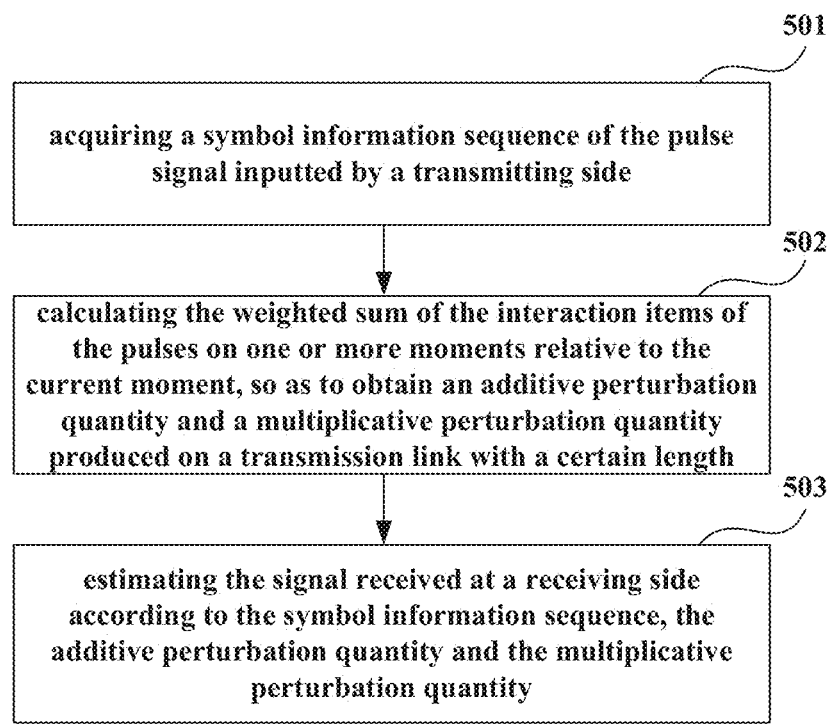
FIG. 5 is a flowchart of the nonlinear estimating method of the embodiments of the present invention.

FIG. 5 is a flowchart of the nonlinear estimating method of the embodiments of the present invention. As shown in FIG. 5, the nonlinear estimating method includes:

step 501: acquiring a symbol information sequence of the pulse signal inputted by a transmitting side;

step 502: calculating the weighted sum of the interaction items of the pulses on one or more moments relative to the current moment, so as to obtain an additive perturbation quantity and a multiplicative perturbation quantity produced on a transmission link with a certain length;

where the additive perturbation quantity is a weighted sum of the interaction items of the pulses excluding the current polarization state at the current moment, and the multiplicative perturbation quantity is a weighted sum of the interaction items of the pulses including the current polarization state at the current moment; and step 503: estimating the signal received at a receiving side according to the symbol information sequence, the additive perturbation quantity and the multiplicative perturbation quantity.

Furthermore, step 503 may include: performing an additive operation on the symbol information sequence and the additive perturbation quantity, and then performing a multiplicative operation on the result of additive operation and the multiplicative perturbation quantity.

Figure 6:
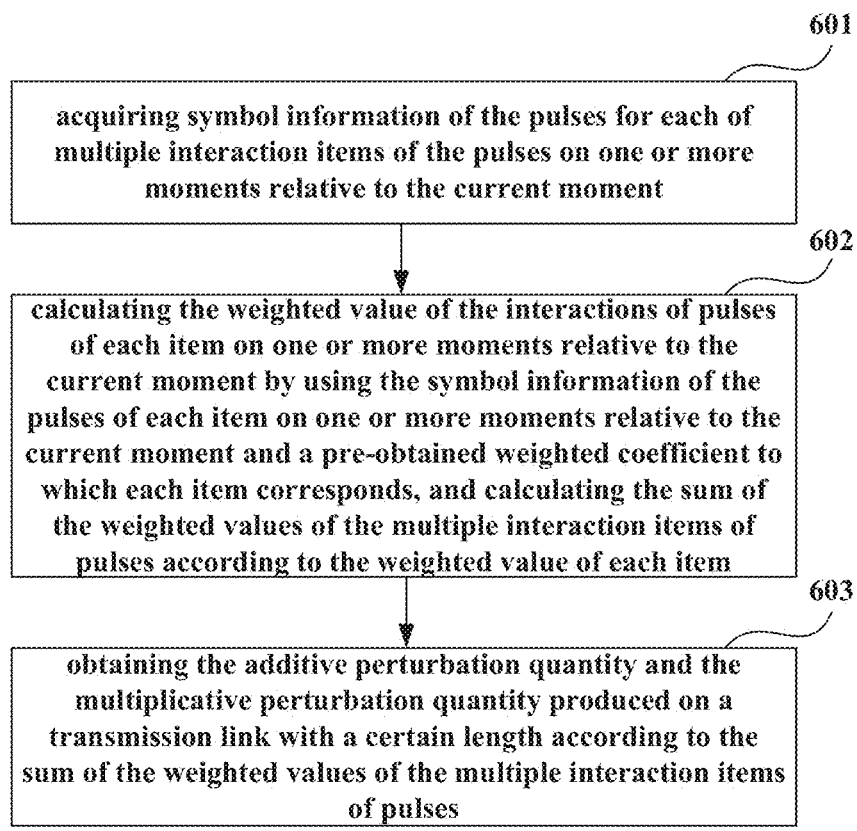
FIG. 6 is a flowchart of the perturbation quantity generating step of the embodiments of the present invention.

FIG. 6 is a flowchart of the perturbation quantity generating step of the embodiments of the present invention. As shown in FIG. 6, step 502 may include:

step 601: acquiring symbol information of the pulses for each of multiple interaction items of the pulses on one or more moments relative to the current moment;

step 602: calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and step 603: obtaining the additive perturbation quantity and the multiplicative perturbation quantity produced on a transmission link with a certain length according to the sum of the weighted values of the multiple interaction items of pulses.

Furthermore, the nonlinear estimating method may further include: a coefficient acquiring step for acquiring the weighted coefficient by simulation, or acquiring the weighted coefficient by experiment, or acquiring the weighted coefficient according to the configuration of the transmission link and the positions of pulses interacted on one or more moments relative to the position of the pulses on the current moment.

In an embodiment, the inputted signals are single polarization signals, and step 502 for estimating signals may use the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

$$\Delta_k^{mul} = -j\left[\sum_n 2|A_{n+k}|^2 C(0, n, z = L) - |A_k|^2 C(0, 0, z = L)\right]$$

where, C(m, n, z=L) denotes the weighted coefficient of each item, $A_{m+k}$ and $A_{n+k}$ denote respectively the symbol information of the pulses at the (m+k)th moment and the (n+k)th moment, and $(A_{m+n+k}^H)^*$ and $(A_{m+n+k})^*$ denotes the conjugation of the symbol information of the pulse at the (m+n+k)th moment.

In an embodiment, the inputted signals are dual polarization signals, and step 502 for estimating signals may use the following formula:

$$u_H(t = kT, z = L) = (A_k^H + \Delta_k^{add})e^{j\Delta_k^{mul}}$$

$$\Delta_k^{add} = \sum_{mn \neq 0} [A_{m+k}^H A_{n+k}^H (A_{m+n+k}^H)^* + A_{m+k}^H A_{n+k}^V (A_{m+n+k}^V)^*]C(m, n, z = L) +$$

$$\sum_{m \neq 0} A_{m+k}^H A_k^V (A_{m+k}^V)^* C(m, 0, z = L)$$

$$\Delta_k^{mul} = -j\sum_n \left[(2|A_{n+k}^H|^2 + |A_{n+k}^V|^2)C(0, n, z = L) - |A_k^H|^2 C(0, 0, z = L)\right]$$

$$u_V(t = kT, z = L) = (A_k^V + \Delta_k^{add'})e^{j\Delta_k^{mul'}}$$

$$\Delta_k^{add'} = \sum_{mn \neq 0} [A_{m+k}^V A_{n+k}^V (A_{m+n+k}^V)^* + A_{m+k}^V A_{n+k}^H (A_{m+n+k}^H)^*]C(m, n, z = L) +$$

$$\sum_{m \neq 0} A_{m+k}^V A_k^H (A_{m+k}^H)^* C(m, 0, z = L)$$

$$\Delta_k^{mul'} = -j\sum_n \left[(2|A_{n+k}^V|^2 + |A_{n+k}^H|^2)C(0, n, z = L) - |A_k^V|^2 C(0, 0, z = L)\right]$$

where, C(m, n, z=L) denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

The embodiments of the present invention further provide a receiver, wherein the receiver includes the nonlinear estimating apparatus as state above.

It can be seen from the above embodiment that an additive perturbation quantity and a multiplicative perturbation quantity produced on a transmission link with a certain length are obtained by calculating the weighted sum of the interaction items of the pulses at one or more moments, and the signal received at a receiving side is estimated according to the time-varying additive perturbation quantity and the multiplicative perturbation quantity; the accuracy of the estimation may be further improved, and the calculation method is simple, applicable to single polarization and polarization multiplexing systems, and at the same time, compatible with any modulation formats.

The above apparatus and method of the present invention may be implemented by hardware, or may be implemented by hardware in combination with software. The present invention relates to such a computer-readable program that when it is executed by a logic component, it enables the logic component to implement the above apparatus or its compositions, or enables the logic component to implement all the method or steps described above. The present further relates to a storage medium in which the above program is stored, such as a hard disk, a floppy disk, a compacted disk, a DVD, or a flash memory, etc.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

For the implementation of the present invention containing the above embodiments, following supplements are further disclosed.

(Supplement 1). A nonlinear estimating apparatus, comprising:

an information sequence acquiring unit, configured to acquire a symbol information sequence of the pulse signal inputted by a transmitting side;

a perturbation quantity generating unit, configured to calculate the weighted sum of the interaction items of the pulses at one or more moments relative to the current moment, so as to obtain an additive perturbation quantity and a multiplicative perturbation quantity produced on a transmission link with a certain length; wherein the additive perturbation quantity is a weighted sum of the interaction items of the pulses excluding the current polarization state at the current moment, and the multiplicative perturbation quantity is a weighted sum of the interaction items of the pulses including the current polarization state at the current moment; and a signal estimating unit, configured to estimate the signal received at a receiving side according to the symbol information sequence, the additive perturbation quantity and the multiplicative perturbation quantity.

(Supplement 2). The nonlinear estimating apparatus according to supplement 1, wherein the perturbation quantity generating unit is configured to calculate a weighted sum of the interactions of pulses on at least two moments relative to the current moment.

(Supplement 3). The nonlinear estimating apparatus according to supplement 1, wherein the perturbation quantity generating unit comprises:

a symbol information acquiring unit, configured to acquire symbol information of the pulses for each of multiple interaction items of the pulses on one or more moments relative to the current moment;

a weighted sum calculating unit, configured to calculate the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and a perturbation quantity acquiring unit, configured to obtain the additive perturbation quantity and the multiplicative perturbation quantity produced on a transmission link with a certain length according to the sum of the weighted values of the multiple interaction items of pulses.

(Supplement 4). The nonlinear estimating apparatus according to supplement 1, wherein the signal estimating unit performs an additive operation on the symbol information sequence and the additive perturbation quantity, and then performs a multiplicative operation on the result of additive operation and the multiplicative perturbation quantity.

(Supplement 5). The nonlinear estimating apparatus according to supplement 3, wherein the nonlinear estimating apparatus further comprises:

a coefficient acquiring unit, configured to acquire the weighted coefficient by simulation, or acquiring the weighted coefficient by experiment, or acquiring the weighted coefficient according to the configuration of the transmission link and the positions of pulses interacted on one or more moments relative to the position of the pulses on the current moment.

(Supplement 6). The nonlinear estimating apparatus according to supplement 4, wherein the inputted pulse signal is a single-polarization signal; and the signal estimating unit uses the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

$$\Delta_k^{mul} = -j\left[\sum_n 2|A_{n+k}|^2 C(0, n, z = L) - |A_k|^2 C(0, 0, z = L)\right]$$

where, $\Delta_k^{add}$ denotes the additive perturbation quantity, $\Delta_k^{mul}$ denotes the multiplicative perturbation quantity, C(m, n, z=L) denotes the weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

(Supplement 7). The nonlinear estimating apparatus according to supplement 4, wherein the inputted pulse signal is a dual-polarization signal; and the signal estimating unit uses the following formula:

$$u_H(t = kT, z = L) = (A_k^H + \Delta_k^{add})e^{j\Delta_k^{mul}}$$

$$\Delta_k^{add} = \sum_{mn \neq 0} [A_{m+k}^H A_{n+k}^H (A_{m+n+k}^H)^* + A_{m+k}^H A_{n+k}^V (A_{m+n+k}^V)^*]C(m, n, z = L) +$$

$$\sum_{m \neq 0} A_{m+k}^H A_k^V (A_{m+k}^V)^* C(m, 0, z = L)$$

$$\Delta_k^{mul} = -j\sum_n [(2|A_{n+k}^H|^2 + |A_{n+k}^V|^2)C(0, n, z = L) - |A_k^H|^2 C(0, 0, z = L)]$$

$$u_V(t = kT, z = L) = (A_k^V + \Delta_k^{add'})e^{j\Delta_k^{mul'}}$$

$$\Delta_k^{add'} = \sum_{mn \neq 0} [A_{m+k}^V A_{n+k}^V (A_{m+n+k}^V)^* + A_{m+k}^V A_{n+k}^H (A_{m+n+k}^H)^*]C(m, n, z = L) +$$

$$\sum_{m \neq 0} A_{m+k}^V A_k^H (A_{m+k}^H)^* C(m, 0, z = L)$$

$$\Delta_k^{mul'} = -j\sum_n [(2|A_{n+k}^V|^2 + |A_{n+k}^H|^2)C(0, n, z = L) - |A_k^V|^2 C(0, 0, z = L)]$$

where, $\Delta_k^{add}$ and $\Delta_k^{add'}$ denote the additive perturbation quantity, $\Delta_k^{mul}$ and $\Delta_k^{mul'}$ denote the multiplicative perturbation quantity, C(m, n, z=L) denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

(Supplement 8). A nonlinear estimating method, comprising:

an information sequence acquiring step, for acquiring a symbol information sequence of the pulse signal inputted by a transmitting side;

a perturbation quantity generating step, for calculating the weighted sum of the interaction items of the pulses on one or more moments relative to the current moment, so as to obtain an additive perturbation quantity and a multiplicative perturbation quantity produced on a transmission link with a certain length; wherein the additive perturbation quantity is a weighted sum of the interaction items of the pulses excluding the current polarization state at the current moment, and the multiplicative perturbation quantity is a weighted sum of the interaction items of the pulses including the current polarization state at the current moment; and a signal estimating step, for estimating the signal received at a receiving side according to the symbol information sequence, the additive perturbation quantity and the multiplicative perturbation quantity.

(Supplement 9). The nonlinear estimating method according to supplement 8, wherein the perturbation quantity generating step comprises: calculating a weighted sum of the interactions of pulses on at least two moments relative to the current moment.

(Supplement 10). The nonlinear estimating method according to supplement 8, wherein the perturbation quantity generating step comprises:

a symbol information acquiring step, for acquiring symbol information of the pulses for each of multiple interaction items of the pulses on one or more moments relative to the current moment;

a weighted sum calculating step, for calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and a perturbation quantity acquiring step, for obtaining the additive perturbation quantity and the multiplicative perturbation quantity produced on a transmission link with a certain length according to the sum of the weighted values of the multiple interaction items of pulses.

(Supplement 11). The nonlinear estimating method according to supplement 8, wherein the signal estimating step performs an additive operation on the symbol information sequence and the additive perturbation quantity, and then performs a multiplicative operation on the result of additive operation and the multiplicative perturbation quantity.

(Supplement 12). The nonlinear estimating method according to supplement 10, wherein the nonlinear estimating method further comprises:

a coefficient acquiring step, for acquiring the weighted coefficient by simulation, or acquiring the weighted coefficient by experiment, or acquiring the weighted coefficient according to the configuration of the transmission link and the positions of pulses interacted on one or more moments relative to the position of the pulses on the current moment.

(Supplement 13). The nonlinear estimating method according to any one of supplements 8-12, wherein the inputted pulse signal is a single-polarization signal; and the signal estimating step uses the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

-continued $$\Delta_k^{mul} = -j\left[\sum_n 2|A_{n+k}|^2 C(0, n, z = L) - |A_k|^2 C(0, 0, z = L)\right]$$

where, $\Delta_k^{add}$ denotes the additive perturbation quantity, $\Delta_k^{mul}$ denotes the multiplicative perturbation quantity, C(m, n, z=L) denotes the weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

(Supplement 14). The nonlinear estimating method according to any one of supplements 8-12, wherein the inputted pulse signal is a dual-polarization signal; and the signal estimating unit uses the following formula:

$$u_H(t = kT, z = L) = (A_k^H + \Delta_k^{add})e^{j\Delta_k^{mul}}$$

$$\Delta_k^{add} = \sum_{mn \neq 0} [A_{m+k}^H A_{n+k}^H (A_{m+n+k}^H)^* + A_{m+k}^H A_{n+k}^V (A_{m+n+k}^V)^*]C(m, n, z = L) + \sum_{m \neq 0} A_{m+k}^H A_k^V (A_{m+k}^V)^* C(m, 0, z = L)$$

$$\Delta_k^{mul} = -j\sum_n [(2|A_{n+k}^H|^2 + |A_{n+k}^V|^2)C(0, n, z = L) - |A_k^H|^2 C(0, 0, z = L)]$$

$$u_V(t = kT, z = L) = (A_k^V + \Delta_k^{add'})e^{j\Delta_k^{mul'}}$$

$$\Delta_k^{add'} = \sum_{mn \neq 0} [A_{m+k}^V A_{n+k}^V (A_{m+n+k}^V)^* + A_{m+k}^V A_{n+k}^H (A_{m+n+k}^H)^*]C(m, n, z = L) + \sum_{m \neq 0} A_{m+k}^V A_k^H (A_{m+k}^H)^* C(m, 0, z = L)$$

$$\Delta_k^{mul'} = -j\sum_n [(2|A_{n+k}^V|^2 + |A_{n+k}^H|^2)C(0, n, z = L) - |A_k^V|^2 C(0, 0, z = L)]$$

where, $\Delta_k^{add}$ and $\Delta_k^{add'}$ denote the additive perturbation quantity, $\Delta_k^{mul}$ and $\Delta_k^{mul'}$ denote the multiplicative perturbation quantity, C(m, n, z=L) denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

(Supplement 15). A receiver, comprising the nonlinear estimating apparatus as stated in any one of supplements 1-7.

The invention claimed is:

1. A nonlinear estimating apparatus, comprising:
an information sequence acquiring unit, configured to acquire a symbol information sequence of a pulse signal inputted by a transmitting side, wherein the inputted pulse signal is a single-polarization signal;
a perturbation quantity generating unit, configured to calculate a weighted sum of interaction items of pulses on one or more moments relative to a current moment to obtain an additive perturbation quantity and a multiplicative perturbation quantity produced on a transmission link with a certain length, wherein the additive perturbation quantity is a weighted sum of the interaction items of the pulses excluding a current polarization state at the current moment, and the multiplicative perturbation quantity is a weighted sum of the interaction items of the pulses including the current polarization state at the current moment; and a signal estimating unit, configured to estimate the signal received at a receiving side according to the symbol information sequence, the additive perturbation quantity and the multiplicative perturbation quantity, wherein the signal estimating unit uses the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

$$\Delta_k^{mul} = -j\left[\sum_n 2|A_{n+k}|^2 C(0, n, z = L) - |A_k|^2 C(0, 0, z = L)\right]$$

where, t=kT represents a pulse interval, z=L represents the length of the transmission link, $A_k$ represents the symbol information at the polarization state and where, $\Delta_k^{add}$ denotes the additive perturbation quantity, $\Delta_k^{mul}$ denotes the multiplicative perturbation quantity, C(m, n, z=L) denotes a weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

2. The nonlinear estimating apparatus according to claim 1, wherein the perturbation quantity generating unit comprises:

a symbol information acquiring unit, configured to acquire symbol information of the pulses for each of multiple interaction items on one or more moments relative to the current moment;

a weighted sum calculating unit, configured to calculate a weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and a perturbation quantity acquiring unit, configured to obtain the additive perturbation quantity and the multiplicative perturbation quantity produced on a transmission link with a certain length according to the sum of the weighted values of the multiple interaction items of pulses.

3. The nonlinear estimating apparatus according to claim 2, wherein the nonlinear estimating apparatus further comprises:

a coefficient acquiring unit, configured to acquire the weighted coefficient by simulation, or acquiring the weighted coefficient by experiment, or acquiring the weighted coefficient according to the configuration of the transmission link and the positions of pulses interacted on one or more moments relative to the position of the pulses on the current moment.

4. The nonlinear estimating apparatus according to claim 1, wherein the inputted pulse signal is a dual-polarization signal; and the signal estimating unit uses the following formula:

$$u_H(t = kT, z = L) = (A_k^H + \Delta_k^{add})e^{j\Delta_k^{mul}}$$

$$\Delta_k^{add} = \sum_{mn \neq 0} [A_{m+k}^H A_{n+k}^H (A_{m+n+k}^H)^* + A_{m+k}^H A_{n+k}^V (A_{m+n+k}^V)^*]C(m, n, z = L) + \sum_{m \neq 0} A_{m+k}^H A_k^V (A_{m+k}^V)^* C(m, 0, z = L)$$

$$\Delta_k^{mul} = -j\sum_n [(2|A_{n+k}^H|^2 + |A_{n+k}^V|^2)C(0, n, z = L) - |A_k^H|^2 C(0, 0, z = L)]$$

$$u_V(t = kT, z = L) = (A_k^V + \Delta_k^{add'})e^{j\Delta_k^{mul'}}$$

$$\Delta_k^{add'} = \sum_{mn \neq 0} [A_{m+k}^V A_{n+k}^V (A_{m+n+k}^V)^* + A_{m+k}^V A_{n+k}^H (A_{m+n+k}^H)^*]C(m, n, z = L) + \sum_{m \neq 0} A_{m+k}^V A_k^H (A_{m+k}^H)^* C(m, 0, z = L)$$

$$\Delta_k^{mul'} = -j\sum_n [(2|A_{n+k}^V|^2 + |A_{n+k}^H|^2)C(0, n, z = L) - |A_k^V|^2 C(0, 0, z = L)]$$

where, $\Delta_k^{add}$ and $\Delta_k^{add'}$ denote respectively horizontal and vertical polarization states the additive perturbation quantity, $\Delta_k^{mul}$ and $\Delta_k^{mul'}$ denote respectively horizontal and vertical polarization states the multiplicative perturbation quantity, C(m, n, z=L) denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

5. A nonlinear estimating method, comprising:

an information sequence acquiring step, for acquiring a symbol information sequence of a pulse signal inputted by a transmitting side, wherein the inputted pulse signal is a single-polarization signal;

a perturbation quantity generating step, for calculating a weighted sum of interaction items of pulses on one or more moments relative to a current moment to obtain an additive perturbation quantity and a multiplicative perturbation quantity produced on a transmission link with a certain length, wherein the additive perturbation quantity is a weighted sum of the interaction items of the pulses excluding the current polarization state at the current moment, and the multiplicative perturbation quantity is a weighted sum of the interaction items of the pulses including the current polarization state at the current moment; and a signal estimating step, for estimating the signal received at a receiving side according to the symbol information sequence, the additive perturbation quantity and the multiplicative perturbation quantity, wherein the signal estimating unit uses the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

-continued $$\Delta_k^{mul} = -j\left[\sum_n 2|A_{n+k}|^2 C(0, n, z = L) - |A_k|^2 C(0, 0, z = L)\right]$$

where, t=kT represents a pulse interval, z=L represents the length of the transmission link, $A_k$ represents the symbol information at the polarization state and where, $\Delta_k^{add}$ denotes the additive perturbation quantity, $\Delta_k^{mul}$ denotes the multiplicative perturbation quantity, C(m, n, z=L) denotes a weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

6. The nonlinear estimating method according to claim 5, wherein the perturbation quantity generating step comprises:
a symbol information acquiring step, for acquiring symbol information of the pulses for each of multiple interaction items of the pulses on one or more moments relative to the current moment;
a weighted sum calculating step, for calculating a weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item; and
a perturbation quantity acquiring step, for obtaining the additive perturbation quantity and the multiplicative perturbation quantity produced on a transmission link with a certain length according to the sum of the weighted values of the multiple interaction items of pulses.

7. A receiver comprising: an information sequence acquiring unit, configured to acquire a symbol information sequence of a pulse signal inputted by a transmitting side, wherein the inputted pulse signal is a single-polarization signal;

a perturbation quantity generating unit, configured to calculate a weighted sum of interaction items of pulses on one or more moments relative to a current moment to obtain an additive perturbation quantity and a multiplicative perturbation quantity produced on a transmission link with a certain length, wherein the additive perturbation quantity is a weighted sum of the interaction items of the pulses excluding a current polarization state at the current moment, and the multiplicative perturbation quantity is a weighted sum of the interaction items of the pulses including the current polarization state at the current moment; and a signal estimating unit, configured to estimate the signal received at a receiving side according to the symbol information sequence, the additive perturbation quantity and the multiplicative perturbation quantity, wherein the signal estimating unit uses the following formula:

$$u(t = kT, z = L) = (A_k + \Delta_k^{add})e^{j\Delta_k^{mul}}$$

$$\Delta_k^{add} = \sum_{mn \neq 0} A_{m+k} A_{n+k} (A_{m+n+k})^* C(m, n, z = L)$$

$$\Delta_k^{mul} = -j\left[\sum_n 2|A_{n+k}|^2 C(0, n, z = L) - |A_k|^2 C(0, 0, z = L)\right]$$

where, t=kT represents a pulse interval, z=L represents the length of the transmission link, $A_k$ represents the symbol information at the polarization state and where, $\Delta_k^{add}$ denotes the additive perturbation quantity, $\Delta_k^{mul}$ denotes the multiplicative perturbation quantity, C(m, n, z=L) denotes a weighted coefficient of each item, $A_{m+k}$ and $A_{n+k}$ denote respectively the symbol information of the pulses on the (m+k)th and the (n+k)th moments, and $(A_{m+n+k})^*$ denotes the conjugation of the symbol information of the pulses on the (m+n+k)th moment.

* * * * *